Oct. 21, 1930.   F. G. WITHROW   1,779,153
BRAKE LEVER ANTIRATTLER
Filed Oct. 21, 1929
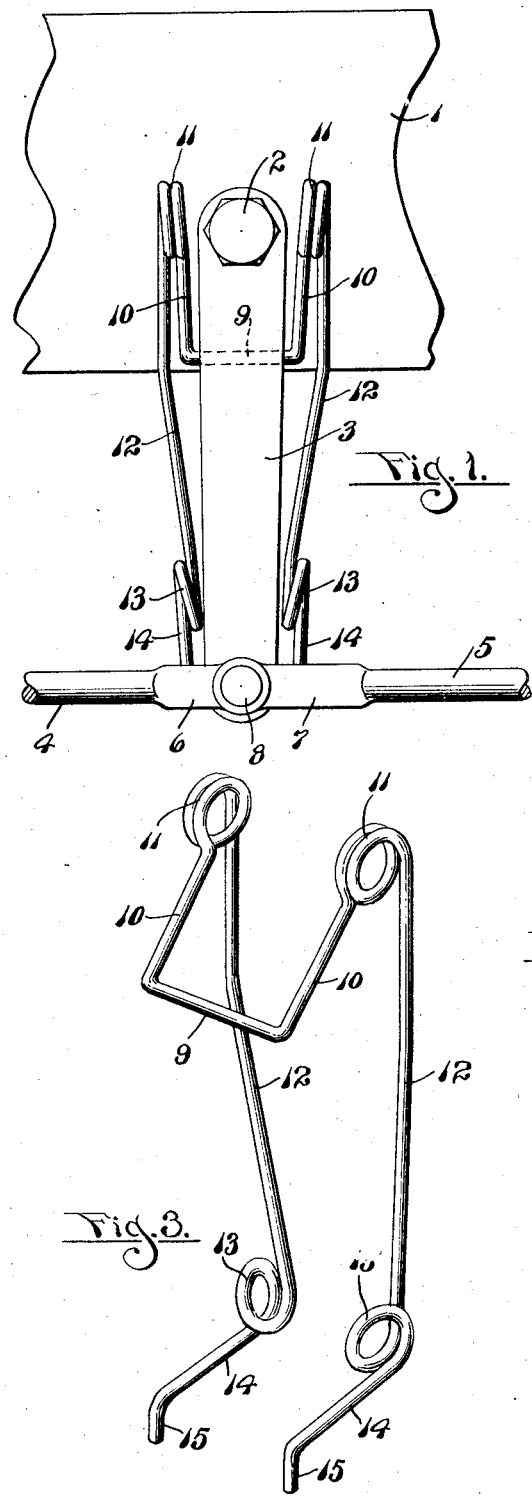
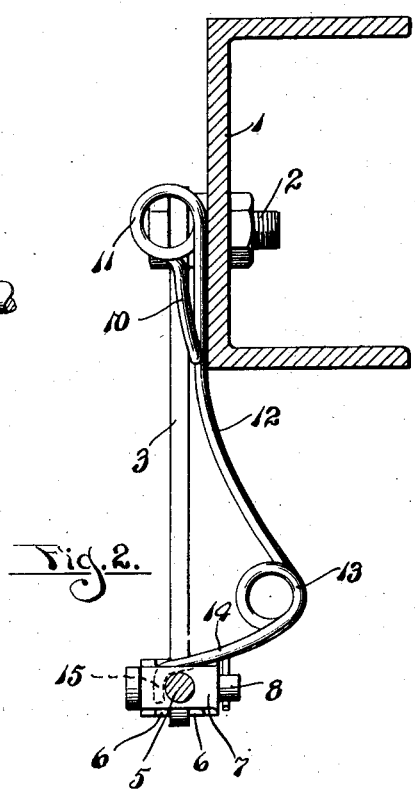
Inventor
Floyd G. Withrow
By Liverance and
Van Antwerp
Attorneys Patented Oct. 21, 1930

1,779,153

UNITED STATES PATENT OFFICE

FLOYD G. WITHROW, OF GRAND RAPIDS, MICHIGAN

BRAKE-LEVER ANTIRATTLER

Application filed October 21, 1929. Serial No. 401,340.

This invention relates to an anti-rattler or silencer for brake rods on automobiles particularly useful to eliminate noise and rattle at connecting joints between forwardly and rearwardly extending brake rods at a side of an automobile, and a pivotally mounted supporting arm therefor, the rods leading to and being operably connected to the service brakes associated with the front and rear wheels of the automobile at a side thereof.

In certain makes of cars, an idler lever depends from each of the side chassis frame members of the automobile and at its lower end is pivotally connected with brake rods which extend from the lower end of the arm in forward and rear directions, respectively. The arm is pivotally suspended from the chassis frame member. The two pivot joints, one at each end of the arm, are liable to wear and become loose and rattle and my invention is directed to a simply constructed device which eliminates all tendency for rattle or other noise at such joints.

An understanding of the invention may be had from the following description taken in connection with the accompanying drawing, in which, Fig. 1 is a fragmentary side elevation showing the silencer applied to brake rods and the idler arm carrying the same.

Fig. 2 is an end elevation, with parts in section, of the construction shown in Fig. 1, and Fig. 3 is a somewhat enlarged perspective view of the silencer device.

Like reference characters refer to like parts in the different figures of the drawing.

To the chassis side frame member 1 a depending arm 3 is pivotally connected, a bolt 2 passing through the upper end of the arm 3 and through the web of the channel which is used in making chassis frame member. A rear brake rod 4 and a front brake rod 5 are formed at their adjacent ends with yokes 6 and 7 respectively, the yoke 6 on the rod 4 having its sides passed, one to each side of the arm 3, while the yoke 7 is wider so that the arms thereof overlap and pass one at the outer side of each of the sides of the yoke 6. A pivot pin 8 passes through the free ends of all the yoke sides and through the lower end of the arm 3.

A silencer which I have devised for application to the arm 3 and the yokes of the brake rods is made from a single length of stiff spring wire. It includes, at its middle, a section 9 from which two arms 10 are bent substantially at right angles, the same extending upwardly and at their upper ends being formed into spring coils 11. The ends of the coils are continued downwardly making two sides 12 which at their lower portions converge somewhat and which at their lower ends are formed into spring coils 13. The wire rod extends from each coil 13 in a section 14, which sections are located substantially at right angles to the parts 12 each terminating in a downturned terminal lip or hook 15.

In applying the silencer to the idler arm 3 and the brake rods, the section 9 is located between the arm 3 and a side of the chassis frame member 1 with the upper end portions of the sides 12 bearing against the outer side of the frame member 1. The terminal parts or hooks 15 are inserted between the sides of the yokes 6 and 7, one at each side of the pivot 8. In thus applying the silencer the device is distorted considerably from its normal form as shown in Fig. 3. That is, the U-shaped portion made by the sections 9 and 10 is bent back so as to lie between and in substantially the same plane as the upper end portions of the parts 12. The parts 12 below the chassis frame member 1 are curved inwardly, as shown in Fig. 2, and the sections 14 are likewise curved so as to engage the hooks 15 properly with the yokes 6 and 7. This causes a considerable force to be exerted upon the pivot points at 2 and 8 described and upon the parts which are there pivotally connected so that any looseness caused by wear or otherwise which would tend to produce rattling noises or the like is taken care of and the joints are held securely against movement or vibration which would produce undesirable noise.

The anti-rattler construction described is of relatively simple structure, is very quickly and easily applied and when once applied is not liable to disconnect from the parts with which engaged. Rattling noises which tend to be produced at the joints described are completely silenced. The invention is defined in the appended claims and is to be considered comprehensive of all forms of structure coming within their scope.

I claim:

1. A device of the class described, formed from a single length of resilient spring wire bent at its middle into U-shape to provide spaced apart leg sections of the U connected by a cross member, spring coils formed at the ends of said leg sections and then continued to form two spaced apart sides, said sides and the leg sections of said U normally being located at an acute angle to each other, other spring coils integral with said side sections from which terminal sections extend located in a plane substantially at right angles to the plane of said sides, said terminal sections at their free ends being bent at right angles to form a short lip or hook, for the purposes described.

2. A device of the class described made from a single length of resilient spring wire comprising, two spaced apart vertical sides, spring coils formed integral with and at each end of said sides, said coils at the upper ends being connected by an integral U-shaped loop and said coils at the lower ends of said sides having horizontal parts extending therefrom each of which terminates at its free end in a down turned hook.

3. In combination with a motor vehicle chassis side frame member, an arm pivotally connected at its upper end to said frame member and extending downwardly, two horizontal rods pivotally connected to the lower end of said arm and extending in opposite directions therefrom, and a silencer device formed from spring material mounted at its upper end between said arm and the adjacent side of the chassis frame member and at its lower end engaged with said rods, said silencer device being sprung out of normal shape when applied to said rods and arm thereby exerting continuous spring force upon the parts pivotally connected together to eliminate noises from rattling.

4. In combination with a motor vehicle chassis side frame member, a vertical arm pivotally connected at its upper end thereto and extending downwardly, two rods having forked ends pivotally connected to the lower end of said arm and extending in opposite directions therefrom, and a silencer device made of spring wire formed into a U-shaped loop between its ends, the middle portion of said loop lying between the upper portion of said arm and the chassis side frame member, spring coils at the ends of the sides of said loop, vertical sides extending downwardly from said coils, other spring coils at the lower ends of said sides, and terminal sections extending from the second coils at an angle to said sides and terminating in downturned hooks, said hooks engaging with the forked ends of said rods, said coils, sides and terminal sections of said device being sprung from normal position when attached, for the purposes described.

In testimony whereof I affix my signature.

FLOYD G. WITHROW.